United States Patent [19]
Cho

[11] Patent Number: 5,870,694
[45] Date of Patent: Feb. 9, 1999

[54] VELOCITY DETECTOR AND VELOCITY DETECTION METHOD FOR A SLED MOTOR

[75] Inventor: Gea-ok Cho, Suwon, Rep. of Korea

[73] Assignee: Samsung Electronics Company Co., Ltd., Kyungki-do, Rep. of Korea

[21] Appl. No.: 772,123

[22] Filed: Dec. 20, 1996

[30]      Foreign Application Priority Data

Dec. 22, 1995  [KR]   Rep. of Korea ................... 54744/1995

[51] Int. Cl.$^6$ ....................................................... G01P 3/36
[52] U.S. Cl. ............................................ 702/96; 742/146
[58] Field of Search ....................... 324/175; 250/231.13, 250/231.16; 702/86–96, 106–107, 189, 190, 191

[56]                References Cited

U.S. PATENT DOCUMENTS

| | | | |
|---|---|---|---|
| 4,156,169 | 5/1979 | Imamura | 318/616 |
| 4,337,426 | 6/1982 | Imamura | 318/616 |
| 4,357,566 | 11/1982 | DuVall | 341/114 |

*Primary Examiner*—John Barlow
*Assistant Examiner*—Craig Steven Miller
*Attorney, Agent, or Firm*—Sughrue, Mion, Zinn, Macpeak & Seas, PLLC

[57]            ABSTRACT

A velocity detector for a sled motor is provided. Specifically, the velocity detector contains a multiplexer, a differentiator, a first amplifier, an integrator, a second amplifier, and a third amplifier. The multiplexer inputs a plurality of velocity signals and multiplexes the velocity signals to produce a multiplexed signal, and the differentiator differentiates the multiplexed signal to produce a differentiated signal. The first amplifier amplifies the differentiated signal to produce an amplified signal, and the integrator integrates the amplified signal to produce an integrated signal. The second amplifier amplifies an applied signal to produce an amplified applied signal, and the amplified applied signal and the integrated signal are combined to produce a resultant signal. The third amplifier inputs the resultant signal and amplifies the resultant signal to produce a velocity detection signal. In addition, a method performed by the velocity detector is also provided.

20 Claims, 2 Drawing Sheets

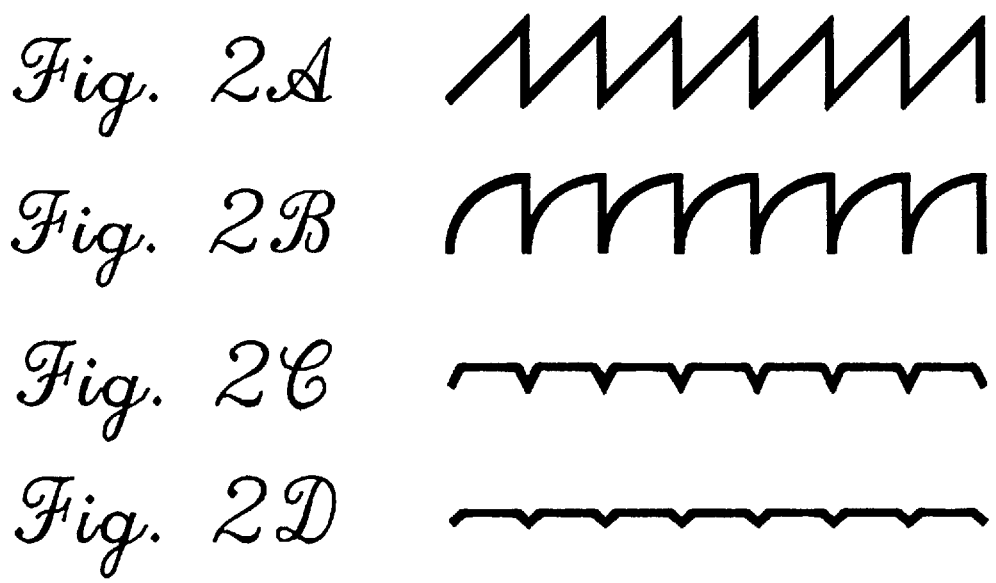

VELOCITY DETECTOR AND VELOCITY DETECTION METHOD FOR A SLED MOTOR

RELATED APPLICATION

The present application is based on Korean Application No. 54744/1995 which is incorporated herein by reference for all purposes.

1. Field of the Invention

The present invention generally relates to an optical reproducer such as a compact disk read only memory ("CD-ROM") and a digital video disk player ("DVDP"). More particularly, the present invention relates to a velocity detector of a sled motor which controls the optical pickup of the reproducer and relates to a corresponding velocity detection method.

2. Background of the Invention

In general, an optical reproducer comprises an optical pickup and a sled motor. The optical pickup reads data from an optical disk, and the sled motor moves the optical pickup to various positions to appropriately access the data from the disc. In order to control the sled motor, detecting velocity signals corresponding to the velocity of the sled motor is necessary, and thus, the reproducer contains a velocity detector for performing such function. Generally, the velocity signals are generated by hole sensors which respectively generate electrical signals in response to the rotational velocity of the sled motor. Furthermore, the signals supplied from the hole sensors have phases which are different from each other.

The velocity detector contains a plurality of differentiators, a multiplexer, and an amplifier. The plurality of differentiators respectively input and differentiate the velocity signals output from the plurality of hole sensors to produce a plurality of differentiated signals. The multiplexer multiplexes the differentiated signals to produce a multiplexed signal, and the amplifier amplifies the multiplexed signal to produce an amplified signal. Then, the velocity of the motor is determined based on the amplified signal.

However, the velocity detector described above has several disadvantages. For example, since the velocity signal have different phases, are respectively differentiated by the plurality of differentiators, and then passed through a multiplexer, an offset is generated between the channels of the velocity signals. The offset may be caused by switching noise components contained in the velocity signals, and as a result of the offset, an access error is often produced by the optical reproducer. Specifically, the multiplexed signal output from the multiplexer is DC-coupled with the amplifier, and thus the offset is increased when it is amplified and output from the amplifier as the amplified signal. Thus, since the rotational velocity of the sled motor is determined in accordance with the amplified signal, the velocity of the motor is not accurately detected.

SUMMARY OF THE INVENTION

An object of the present invention to is provide an optical reproducer which can eliminate the disadvantages described above.

Another object of the present invention is to provide a velocity detector of a sled motor and a velocity detection method which can eliminate an offset and noise contained in velocity signals.

In order to achieve the above and other objects, a velocity detector for a sled motor is provided. Specifically, the velocity detector comprises: a multiplexer which inputs a plurality of velocity signals and multiplexes said velocity signals to produce a multiplexed signal, wherein said velocity signals have different phases; a differentiator which differentiates said multiplexed signal to produce a differentiated signal; an integrator which inputs an unintegrated signal and integrates said unintegrated signal to produce an integrated signal, wherein said unintegrated signal is at least partially based on said differentiated signal output from said differentiator; and a first amplifier which inputs an unamplified signal and amplifies said unamplified signal to produce a velocity detection signal, wherein said unamplified signal is at least partially based on said integrated signal output from said integrator and wherein said velocity detection signal corresponds to a velocity of said sled motor.

In order to further achieve the above and other objects, a velocity detecting method for detecting a velocity of a sled motor is provided. In particular, the method comprises the steps of: (a) inputting a plurality of velocity signals, wherein said velocity signals have different phases; (b) multiplexing said velocity signals to produce a multiplexed signal; (c) differentiating said multiplexed signal to produce a differentiated signal; (d) integrating said differentiated signal to produce an integrated signal; and (e) generating a velocity detection signal based on said integrated signal, wherein said velocity detection signal corresponds to said velocity of said sled motor.

BRIEF DESCRIPTION OF THE DRAWINGS

The above objects and advantages, as well as other objects and advantages, of the present invention will become more apparent by describing in detail preferred embodiments thereof with reference to the attached drawings in which:

FIG. 2A is a waveform diagram of a multiplexed signal A output from a multiplexer 2 shown in FIG. 1;

FIG. 2B is a waveform diagram of a differentiated signal B is output from a differentiator 4 shown in FIG. 1;

FIG. 2C is a waveform diagram of an amplified signal C output from an amplifier 6 shown in FIG. 1; and FIG. 2D is a waveform diagram of an integrated signal D output from an integrator 8 shown in FIG. 1.

DETAILED DESCRIPTION OF THE PREFERRED EMBODIMENT

Figure 1:
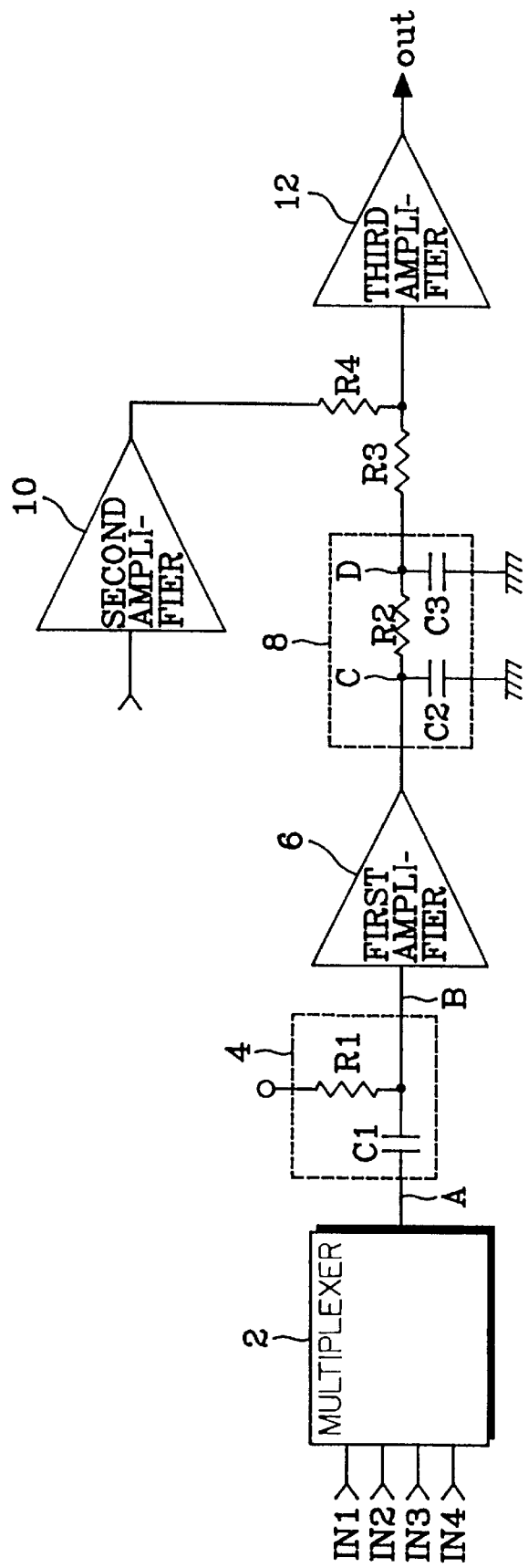
FIG. 1 is a diagram of a velocity detector according to one embodiment of the present invention.

The following description of the preferred embodiments discloses specific circuit configurations, data values, and components. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to such specific features. Furthermore, the descriptions of various features and structures of the present invention which would be known to one skilled in the art are omitted for the sake of clarity and brevity.

One of the basic principles of the present invention is to eliminate an offset between the plurality of the channels of the velocity signals and to accurately detect the velocity of the sled motor. One of the manners in which the above principle is achieved is by not differentiating the velocity signals output from hole sensors by a plurality of respective differentiators.

FIG. 1 shows an embodiment of a velocity detector of a sled motor in accordance with one embodiment of the present invention. As shown in the figure, the detector comprises a multiplexer 2, a differentiator 4, an amplifier 6, an integrator 8, a second amplifier 10, resistors R3 and R4, and a third amplifier 12.

The multiplexer 2 inputs velocity signals IN1 to IN4 and multiplexes such signals IN1 to IN4 to produce a multiplexed signal A (FIG. 2A). The velocity signals IN1 to IN4 are output from corresponding hole sensors and respectively have phases which are different from each other. For example, the phases of the signals IN1 to IN4 may equal 90°, 180°, 270°, and 360°, respectively.

The differentiator 4 inputs the multiplexed signal A and differentiates the multiplexed signal A to produce a differentiated signal B (FIG. 2B). As shown in FIG. 1, the differentiator comprises a capacitor C1 and a resistor R1. A first terminal of the capacitor C1 is connected to an input terminal of the differentiator 4, and a second terminal of the capacitor C1 is connected to an output terminal of the differentiator 4. Furthermore, a first terminal of the resistor R1 is connected to the output terminal of the differentiator 4, and a second terminal of the resistor R1 is connected to a power terminal. As a result of the above configuration, the differentiator 4 eliminates a DC offset component from the multiplexed signal A when it differentiates the signal A to produce the differentiated signal B.

The first amplifier 6 inputs the differentiated signal B and amplifies such signal B to produce an amplified signal C. For example, the amplifier 6 may amplify the signal B by a predetermined number of times to produce the amplified signal C.

The integrator 8 inputs the amplified signal C via an input terminal, integrates the signal C to produce an integrated signal D, and outputs the integrated signal D via an output terminal. The integrator 8 comprises capacitors C2 and C3 and a resistor R2. The capacitor C2 has a first terminal connected to the input terminal of the integrator 8 and a second terminal connected to ground. A first terminal of the resistor R2 is connected to the input terminal of the integrator 8, and a second terminal of the resistor R2 is connected to the output terminal of the integrator 8. Also, the capacitor C3 has a first terminal connected to the output terminal of the integrator 8 and a second terminal connected to ground.

The capacitor C2 acts as a filter which removes noise from the amplified signal to produce a filtered signal. The capacitor C3 and resistor R2 act as an integrating circuit which integrates the filtered signal to produce the integrated signal D. Then, the integrated signal passes through the resistor R3 to generate a first composite signal.

The second amplifier 10 inputs an applied signal APP and amplifies the applied signal to produce an amplified applied signal. Afterwards, the amplified applied signal passes through the resistor R4 to generate a second composite signal, and the first and second composite signals are combined to produce a resultant signal.

The third amplifier 12 inputs the resultant signal and amplifies such signal to generate an amplified resultant signal, The amplified resultant corresponds to the rotational velocity of the sled motor and is output from the velocity detector as a velocity detecting signal OUT.

As described above, the present invention is capable of eliminating an offset from the channels of the velocity signals IN1 to IN4. Accordingly, the accuracy of the velocity detection signal OUT is dramatically improved.

Furthermore, the previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A velocity detector for a sled motor, comprising:

a multiplexer which inputs a plurality of velocity signals and multiplexes said velocity signals to produce a multiplexed signal, wherein said velocity signals have different phases;

a differentiator which differentiates said multiplexed signal to produce a differentiated signal;

an integrator which inputs an unintegrated signal and integrates said unintegrated signal to produce an integrated signal, wherein said unintegrated signal is at least partially based on said differentiated signal output from said differentiator; and a first amplifier which inputs an unamplified signal and amplifies said unamplified signal to produce a velocity detection signal, wherein said unamplified signal is at least partially based on said integrated signal output from said integrator and wherein said velocity detection signal corresponds to a velocity of said sled motor.

2. The velocity detector as claimed in claim 1, further comprising:

a second amplifier which amplifies said differentiated signal output from said differentiator to produce said unintegrated signal.

3. The velocity detector as claimed in claim 2, further comprising:

a third amplifier which inputs an applied signal and amplifies said applied signal to produce an amplified applied signal, wherein said amplified applied signal is combined with said integrated signal to produce said unamplified signal input to said first amplifier.

4. The velocity detector as claimed in claim 3 wherein said differentiator comprises:

a first capacitor having a first capacitor terminal and a second capacitor terminal; and a first resistor having a first resistor terminal and a second resistor terminal, wherein said first capacitor terminal inputs said multiplexed signal, and wherein said second capacitor terminal is connected to said first resistor terminal and outputs said differentiated signal.

5. The velocity detector as claimed in claim 4, wherein said integrator comprises:

a filter which inputs said unintegrated signal and filters said unintegrated signal to produce a filtered signal; and an integrating circuit which inputs said filtered signal and integrates said filtered signal to produce said integrated signal.

6. The velocity detector as claimed in claim 5, wherein said filter comprises:

a second capacitor having a third capacitor terminal connected to an integrator input terminal of said integrator and having a fourth capacitor terminal connected to ground.

7. The velocity detector as claimed in claim 6, wherein said integrating circuit comprises:
  a second resistor having a third resistor terminal which inputs said filtered signal and a fourth resistor terminal; and
  a third capacitor having a fifth capacitor terminal, which is connected to said fourth resistor terminal and an output terminal of said integrator, and a sixth capacitor terminal connected to said ground.

8. The velocity detector as claimed in claim 1, further comprising:
  a second amplifier which inputs an applied signal and amplifies said applied signal to produce an amplified applied signal, wherein said amplified applied signal is combined with said integrated signal to produce said unamplified signal input to said first amplifier.

9. The velocity detector as claimed in claim 1, wherein said differentiator comprises:
  a first capacitor having a first capacitor terminal and a second capacitor terminal; and
  a first resistor having a first resistor terminal and a second resistor terminal,
  wherein said first capacitor terminal inputs said multiplexed signal, and
  wherein said second capacitor terminal is connected to said first resistor terminal and outputs said differentiated signal.

10. The velocity detector as claimed in claim 1, wherein said integrator comprises:
  a filter which inputs said unintegrated signal and filters said unintegrated signal to produce a filtered signal; and
  an integrating circuit which inputs said filtered signal and integrates said filtered signal to produce said integrated signal.

11. The velocity detector as claimed in claim 10, wherein said filter comprises:
  a first capacitor having a first capacitor terminal connected to an integrator input terminal of said integrator and having a second capacitor terminal connected to ground.

12. The velocity detector as claimed in claim 11, wherein said integrating circuit comprises:
  a first resistor having a first resistor terminal which inputs said filtered signal and a second resistor terminal; and
  a second capacitor having a third capacitor terminal, which is connected to said second resistor terminal and an output terminal of said integrator, and a fourth capacitor terminal connected to said ground.

13. The velocity detector as claimed in claim 10, wherein said integrating circuit comprises:
  a first resistor having a first resistor terminal which inputs said filtered signal and a second resistor terminal; and
  a first capacitor having a first capacitor terminal, which is connected to said second resistor terminal and an output terminal of said integrator, and a second capacitor terminal connected to ground.

14. A velocity detecting method for detecting a velocity of a sled motor, comprising the steps of:
  (a) inputting a plurality of velocity signals, wherein said velocity signals have different phases;
  (b) multiplexing said velocity signals to produce a multiplexed signal;
  (c) differentiating said multiplexed signal to produce a differentiated signal;
  (d) integrating said differentiated signal to produce an integrated signal; and
  (e) generating a velocity detection signal based on said integrated signal, wherein said velocity detection signal corresponds to said velocity of said sled motor.

15. The velocity detecting method as claimed in claim 14, wherein said step (d) comprises the steps of:
  (d1) filtering said differentiated signal to produce a filtered signal in which at least some noise components are eliminated; and
  (d2) integrating said filtered signal to produce said integrated signal.

16. The velocity detecting method as claimed in claim 14, wherein said step (d) comprises the steps of:
  (d1) amplifying said differentiated signal to produce an amplified signal;
  (d2) filtering said amplified signal to produce a filtered signal in which at least some noise components are eliminated; and
  (d3) integrating said filtered signal to produce said integrated signal.

17. The velocity detecting method as claimed in claim 16, wherein said step (e) comprises the steps of:
  (e1) inputting an unamplified signal, wherein said unamplified signal is at least partially based on said integrated signal output from said integrator; and
  (e2) amplifying said unamplified signal to produce said velocity detection signal.

18. The velocity detecting method as claimed in claim 17, wherein said step (e1) comprises the steps of:
  (e1a) inputting an applied signal;
  (e1b) amplifying said applied signal to produce an amplified applied signal;
  (e1c) combining said amplified applied signal with said integrated signal to produce said unamplified signal; and
  (e1d) inputting said unamplified signal.

19. The velocity detecting method as claimed in claim 14, wherein said step (e) comprises the steps of:
  (e1) inputting an unamplified signal, wherein said unamplified signal is at least partially based on said integrated signal output from said integrator; and
  (e2) amplifying said unamplified signal to produce said velocity detection signal.

20. The velocity detecting method as claimed in claim 19, wherein said step (e1) comprises the steps of:
  (e1a) inputting an applied signal;
  (e1b) amplifying said applied signal to produce an amplified applied signal;
  (e1c) combining said amplified applied signal with said integrated signal to produce said unamplified signal; and
  (e1d) inputting said unamplified signal.

* * * * *